US012761391B2

(12) United States Patent
Du et al.

(10) Patent No.: US 12,761,391 B2
(45) Date of Patent: Oct. 13, 2026

(54) EM LOGGING TOOL EMPLOYING WIRE TUBE INTERFERENCE MITIGATION

(71) Applicant: Schlumberger Technology Corporation, Sugar Land, TX (US)

(72) Inventors: Michael Du, Manvel, TX (US); Anatoly Dementyev, Sugar Land, TX (US); Mark Frey, Sugar Land, TX (US); Rachel Belleville, Houston, TX (US); Daniel Fernandez, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 156 days.

(21) Appl. No.: 18/819,094

(22) Filed: Aug. 29, 2024

(65) Prior Publication Data

US 2026/0063820 A1 Mar. 5, 2026

(51) Int. Cl.

*G01V 3/28* (2006.01)
*E21B 47/12* (2012.01)
*G01V 3/30* (2006.01)
*G01V 3/34* (2006.01)

(52) U.S. Cl.

CPC ................ *G01V 3/28* (2013.01); *E21B 47/12* (2013.01); *E21B 47/138* (2020.05); *G01V 3/34* (2013.01); *G01V 3/30* (2013.01)

(58) Field of Classification Search

CPC ... G01V 3/28; G01V 3/30; G01V 3/34; G01V 3/104; G01V 11/002; G01V 11/005; E21B 47/12; E21B 47/138; E21B 17/003; E21B 47/13; E21B 17/023; E21B 17/028; E21B 17/0285; E21B 17/1035; E21B 17/206

See application file for complete search history.

(56) References Cited

U.S. PATENT DOCUMENTS 3,876,972 A * 4/1975 Garrett .................... E21B 47/13 73/862.339
4,051,456 A * 9/1977 Heilhecker ........... E21B 17/003 33/312
5,402,068 A 3/1995 Meador
5,419,188 A * 5/1995 Rademaker ........... E21B 47/002 73/152.54
5,453,693 A * 9/1995 Sinclair .................... G01V 3/30 324/338
5,894,104 A * 4/1999 Hedberg ................ H01B 7/046 174/36
5,920,032 A * 7/1999 Aeschbacher ........... H01B 7/16 174/113 C
7,180,825 B2 2/2007 Shah et al.

(Continued)

*Primary Examiner* — Steven L Yeninas

(74) *Attorney, Agent, or Firm* — Jeffrey D. Frantz

(57) ABSTRACT

An electromagnetic logging tool includes at least one electromagnetic receiving antenna deployed on a logging while drilling tool body. The receiving antenna is configured to receive a complex voltage signal and thereby make electromagnetic logging measurements. An electrically conductive tube is deployed in the tool body and within an inner diameter of the receiving antenna such that a longitudinal axis of the tube is coincident with a longitudinal axis of the tool body. An insulated electrical conductor is deployed in the tube and is configured to transmit electronic data and/or electrical power from one axial end of the tool body to an opposing axial end of the tool body.

20 Claims, 3 Drawing Sheets

(56) References Cited

U.S. PATENT DOCUMENTS

| | | | | |
|---|---|---|---|---|
| 8,195,305 | B2 | 6/2012 | Nghiem et al. | |
| 9,638,028 | B2 | 5/2017 | Gao et al. | |
| 10,895,146 | B1 * | 1/2021 | Rashed | E21B 47/01 |
| 2003/0056984 | A1 * | 3/2003 | Smith | E21B 47/017<br>166/381 |
| 2008/0143336 | A1 * | 6/2008 | Legendre | G01V 3/28<br>324/339 |
| 2010/0052941 | A1 * | 3/2010 | Madhavan | E21B 17/0283<br>307/104 |
| 2015/0177412 | A1 * | 6/2015 | San Martin | G01V 13/00<br>702/7 |
| 2025/0232895 | A1 * | 7/2025 | Glasscock | H01B 7/046 |

* cited by examiner

EM LOGGING TOOL EMPLOYING WIRE TUBE INTERFERENCE MITIGATION

CROSS REFERENCE TO RELATED APPLICATIONS

None.

BACKGROUND INFORMATION

Electromagnetic (EM) logging measurements are commonly made in oilfield operations (e.g., during wireline and logging while drilling operations). Such measurements may provide formation resistivity and dielectric properties as well as information about remote geological features not intercepted by the measurement tool (e.g., remote beds, bed boundaries, and/or fluid contacts). This information may be used to evaluate the potential hydrocarbon bearing capacity of the formation as well as to provide information for steering the direction of drilling (e.g., in a geosteering or payzone steering operation).

Deep reading EM measurements are commonly made at lower frequencies (e.g., less than about 10 kHz) and using a large axial spacing distance between the transmitter and receiver (e.g., greater than about 10 m). Such low frequency measurements can be particularly sensitive to electromagnetic noise, for example, via electromagnetic coupling between the receiver antenna and alternating currents in power and/or communication wires in the EM tool. Such coupling can reduce the overall signal to noise ratio of the measurement and significantly reduce the deep reading measurement range away from the tool.

While this difficulty can be partially mitigated by careful routing of the power and/or communication wire(s) through the tool collar, electromagnetic noise remains problematic, particularly for very low frequency measurements and those that employ co-located receiver embodiments. There is a need for improvements to reduce such noise.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
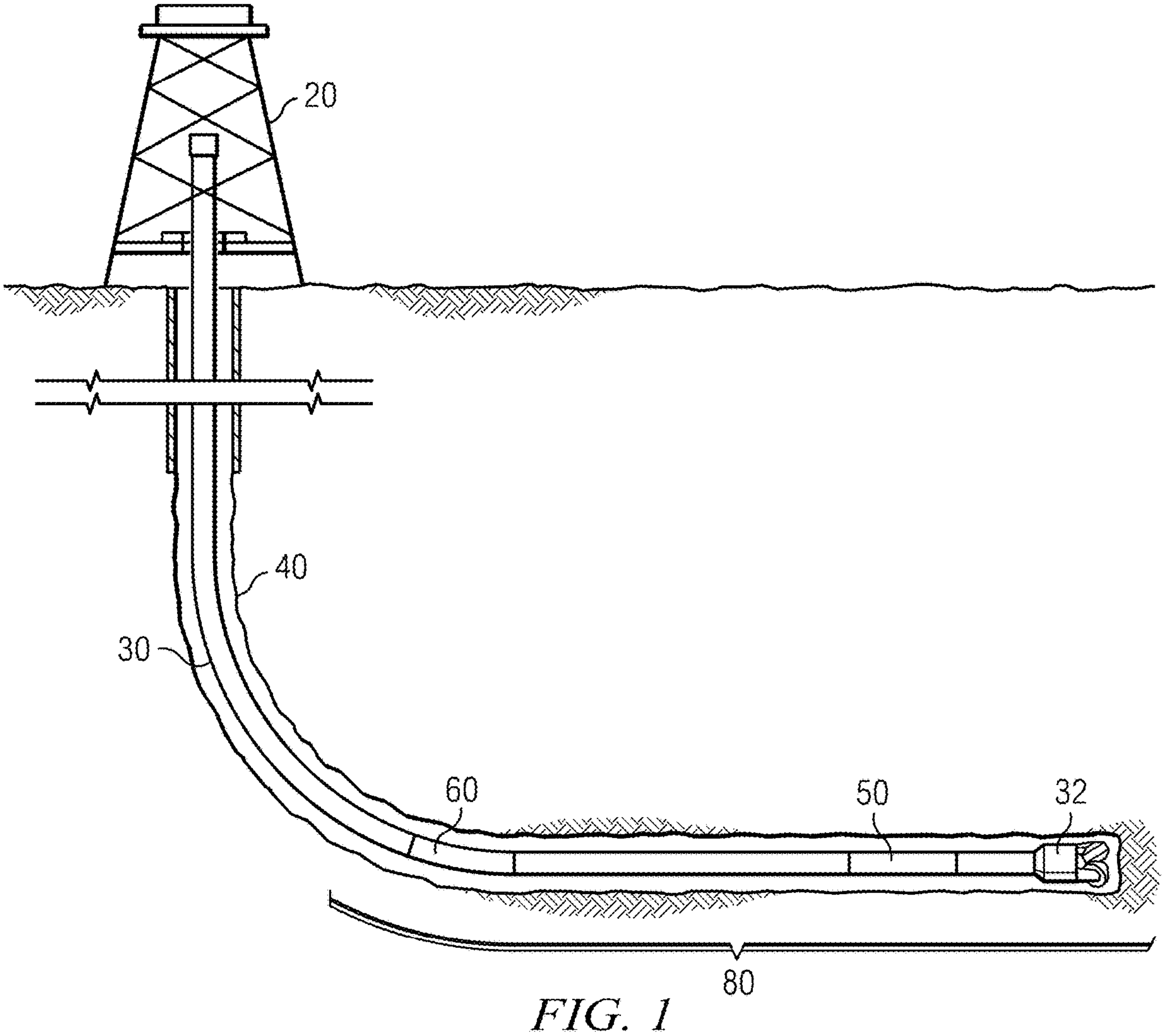
FIG. 1 depicts an example drilling rig including a disclosed deep reading EM logging tool.

A disclosed electromagnetic logging tool includes at least one electromagnetic receiving antenna deployed on a logging while drilling tool body. The receiving antenna is configured to receive a complex voltage signal and thereby make electromagnetic logging measurements (e.g., while drilling). An electrically conductive tube is deployed in the tool body and within an inner diameter of the receiving antenna such that a longitudinal axis of the tube is coincident with a longitudinal axis of the tool body. An insulated electrical conductor is deployed in the tube and is configured to transmit electronic data and/or electrical power from one axial end of the tool body to an opposing axial end of the tool body.

The disclosed embodiments may advantageously reduce (or substantially eliminate) electromagnetic coupling between electrical current in the electrical conductor and the receiving antenna thereby improving the signal to noise ratio of electromagnetic measurements made using the logging tool. The improved signal to noise ratio may provide for improved measurement accuracy and precision, particularly for deep reading electromagnetic measurements made at low frequencies.

As is known to those of ordinary skill in the art, EM logging measurements may be made by electromagnetically coupling an EM transmitting antenna with one or more receiving antennas. For example, propagation measurements enable formation resistivity to be estimated via measuring the propagation effect of the EM field (i.e., the phase shift and attenuation of the electromagnetic field). Commercial propagation measurements are commonly made at relatively high frequencies (e.g., at 400 kHz and 2 MHz) where the skin depth $\delta$ is small and the propagation constant is sufficient large that the phase shift and attenuation can be accurately measured. Deep EM logging measurements are commonly made at lower frequencies (e.g., in a range from 1 kHz to 100 kHz) and may also have a sufficiently large propagation constant (owing to the large spacing distance between the transmitters and receivers) such that the phase shift and attenuation can also be accurately measured. While not strictly limited in this regard, the disclosed EM logging tool (or receiver sub) may be particularly well suited for such deep EM measurements.

As is known to those of ordinary skill in the art, coupling an EM transmitting antenna and one or more receiving antennas may be accomplished by applying a time varying electrical current (an alternating current) in a transmitting antenna to transmit EM energy into the surrounding environment (including the formation). This is referred to as "firing" the transmitter. The transmitted energy generates a corresponding time varying magnetic field in the local environment (e.g., in the tool collar, borehole fluid, and formation). The magnetic field in turn induces electrical currents (eddy currents) in the conductive formation. These eddy currents further produce secondary magnetic fields which may produce a voltage response in a receiving antenna (the EM energy is received, for example, via measuring the complex-valued voltage in the receiving antenna). It will be understood that electromagnetic interference may also produce an interference voltage response in a receiving antenna and may thereby degrade the signal to noise of the EM logging measurements.

FIG. 1 depicts a schematic drilling rig 20 including a drill string 30 and an example EM logging tool 100 (FIG. 2) deployed in the string 30 and disposed within a wellbore 40. As described in more detail below the EM logging tool 100 may optionally include a deep reading EM logging tool having distinct transmitter 50 and receiver 60 subs deployed in a bottom hole assembly (BHA) 80. The drilling rig 20 may be deployed in either onshore or offshore applications (an onshore application is depicted). In this type of system, the wellbore 40 may be formed in subsurface formations by rotary drilling in a manner that is well-known to those of ordinary skill in the art (e.g., via well-known directional drilling techniques).

While not depicted, it will be understood that the BHA 80 may further include other suitable downhole tools, such as a rotary steerable system (RSS), a motor, drill bit 32, a measurement while drilling (MWD) tool, and/or one or more other logging-while-drilling (LWD) tools. The other LWD tools may be configured to measure one or more properties of the formation through which the wellbore penetrates, for example, including NMR relaxation times, density, porosity, sonic velocity, gamma ray counts, and the like. A suitable MWD tool may be configured to measure one or more properties of the wellbore 40 as it is drilled or at any time thereafter. The physical properties may include, for example, pressure, temperature, wellbore caliper, wellbore trajectory (attitude), a toolface angle, and the like.

It will, of course, be understood that the disclosed embodiments are not limited to any particular BHA configuration. Nor are they limited to any particular type of drilling operation. Moreover, the disclosed embodiments are not limited to logging while drilling applications (as depicted on FIG. 1) but may also be implemented in wireline logging applications.

Figure 2:
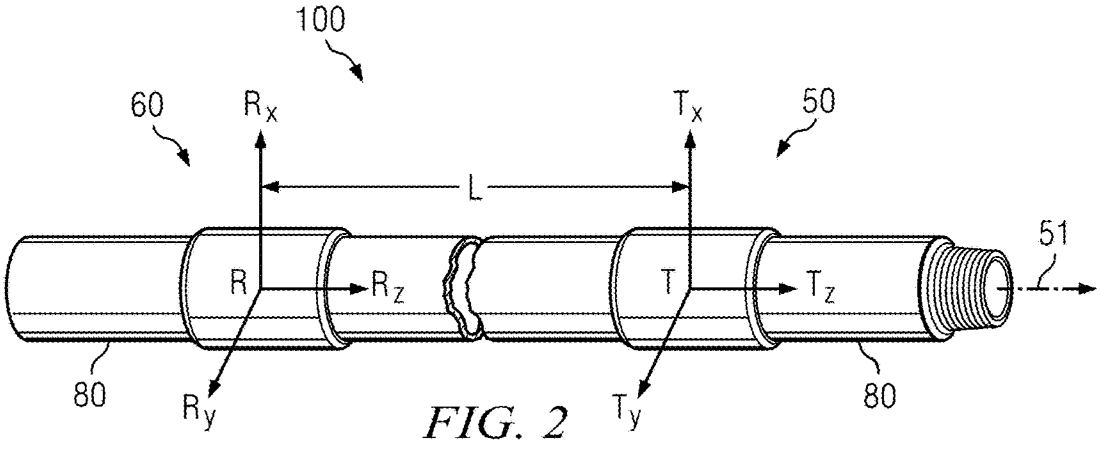
FIG. 2 depicts one example embodiment of the deep reading EM logging tool shown in FIG. 1.

FIG. 2 depicts one example embodiment of EM logging tool 100. In the depicted example embodiment, the tool 100 includes a transmitter T sub 50 and a receiver R sub 60 axially spaced apart from one another in the BHA 80 (by a spacing distance L). Although not depicted, it will be appreciated that other BHA tools, e.g., including other logging tools, may be deployed between the subs 50, 60. By deep reading it may be meant that the spacing distance L is greater than 5 meters (e.g., greater than 10 m, greater than 20 m, greater than 30 m, greater than 50 m, or even greater than 100 m). It will be appreciated that the disclosed embodiments are not limited to BHA configurations in which the transmitter T is deployed below the receiver R in the BHA (as depicted). Moreover, while the disclosed embodiments are particularly well suited for deep reading EM measurements, the disclosure is not limited in that regard. For example, the transmitter T and receiver R may be deployed on a common collar and any suitable receiver spacing L may be utilized to achieve a desired measurement depth. Furthermore, the disclosed embodiments are not limited to the use With continued reference to FIG. 2, it will be understood that while not depicted, the logging tool 100 may include multiple transmitters and receivers (e.g., multiple triaxial transmitter and receiver sets) spaced apart on the tool body, thereby enabling multiple sets of measurements to be made at multiple spacing distances (e.g., at spacing distances up to and exceeding 10, 20, or even 30 m). In the depicted example embodiment, the transmitter T and receiver R may each include a triaxial antenna arrangement (e.g., three mutually orthogonal antennas including an axial antenna and first and second transverse antennas that are orthogonal to one another in the depicted example embodiment). For example, the transmitter and receiver may include three collocated tri-axial antennas having mutually orthogonal moments $T_x$, $T_y$, $T_z$ and $R_x$, $R_y$, $R_z$ that are aligned with corresponding x-, y-, and z-directions (axes) in the wellbore or tool reference frames. By collocated it is meant that the axial spacing of the antenna moments is less than the diameter of the tool collar on which they are deployed. While the disclosed embodiment depicts a configuration in which the z-direction is aligned with the tool axis 51, it will be understood that the disclosed embodiments are not limited to any particular coordinate system or any particular orientation of the coordinate system (e.g., any particular orientation of the x-, y-, and z-axes on the tool).

The transmitter T and receiver R may include any known antenna configurations. For example, the $T_z$ and $R_z$ antennas may include conventional axial antenna arrangements. As is known to those of ordinary skill in the art, an axial antenna is one having a moment ($T_z$ and $R_z$ in FIG. 2) that is substantially parallel with the tool/collar axis 51. Axial antennas are commonly wound about the circumference of the collar such that the plane of the antenna is substantially orthogonal to the tool axis. Likewise, transverse antennas are antennas having moments ($T_x$, $T_y$ and $R_x$, $R_y$ in FIG. 2) that are perpendicular to the tool axis. Such antennas may include conventional transverse antenna arrangements, for example, including saddle coils.

While FIG. 2 depicts an example EM logging tool embodiment including collocated triaxial transmitting and receiving antenna arrangements, it will be appreciated that the disclosed embodiments are not so limited. In other example embodiments, the EM logging tool may include collocated biaxial antenna arrangements or axially spaced (non-collocated) antennas. Moreover, the disclosed embodiments are not limited to the use of axial and/or transverse antennas, but may also (or alternatively) include one or more tilted antennas. As is known to those of ordinary skill a tilted antenna is one whose magnetic moment is neither parallel nor perpendicular with the axis 51 of the tool. Those of ordinary skill will further appreciate that a triaxial antenna arrangement may alternatively include three mutually orthogonal tilted antennas (either collocated with one another or axially spaced apart from one another).

Figure 3:
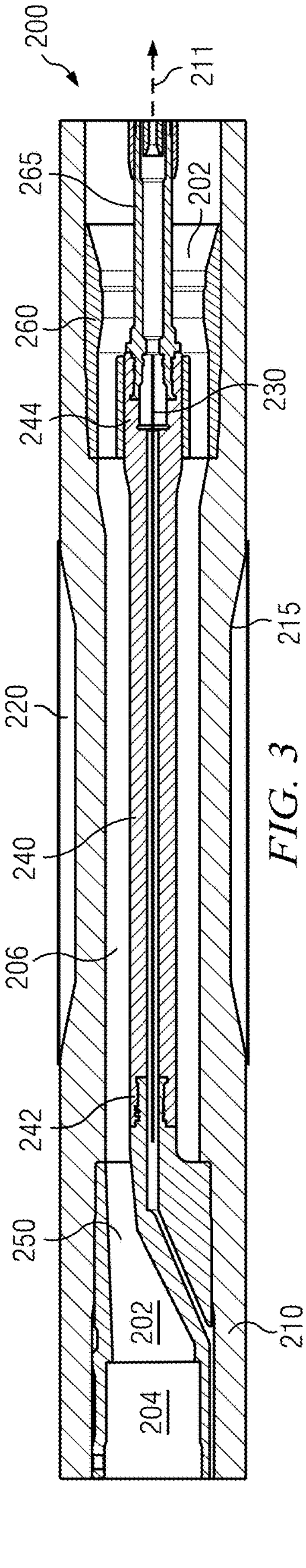
FIG. 3 depicts a receiver portion of an example embodiment of a disclosed EM logging tool.

Turning now to FIG. 3, a receiver portion of one example EM logging tool 200 is depicted. The depicted embodiment may include a distinct receiver sub, such as sub 60 in FIG. 2, or a portion (e.g., a lower portion) of an EM logging tool including at least one receiving antenna. EM logging tool 200 includes an EM receiver 220 deployed on (about) a tool body 210 (also referred to as a tool collar). The receiver 220 may be deployed in an outer circumferential recess 215 in the collar 210 and may include substantially any suitable receiving antenna configuration, for example, including an axial antenna, a transverse antenna, and/or a tilted antenna. In certain advantageous embodiments the tool 200 may include a distinct receiver sub and the receiver 220 may include at least one transverse and/or tilted antenna (e.g., collocated transverse antennas).

In the depicted example embodiment an insulated electrical conductor 230 (e.g., a communications and/or power line or wire) is routed through an electrically conductive tube 240. As depicted, the tube 240 may be coaxial with the collar 210 such that a longitudinal axis of the tube 240 is coincident with a longitudinal axis 211 of the collar 210. As such, the conductor 230 (e.g., the communications and/or power line) may also be substantially coincident with the collar axis 211. It will be understood that deployment of the electrical conductor at the center of (coaxial with) the collar may significantly reduce (or even substantially eliminate) the magnetic moment caused by the alternating current in the line and the corresponding electromagnetic coupling with the receiver.

While centering the electrical conductor may significantly reduce (or even substantially eliminate) electromagnetic coupling, it will be appreciated that the electrical conductor may not be perfectly centered and the receiving antenna may not be perfectly symmetric about the tool axis. Such minor eccentering of the conductor and asymmetry of the receiving antenna may enable significant electromagnetic coupling between alternating currents in the conductor and the receiving antenna (particularly for low frequency deep reading measurements). The electrically conductive tube 240 is intended to shield the electrical conductor and thereby further reduce the electromagnetic coupling (e.g., the electromagnetic coupling enabled by the eccentering of the conductor and the asymmetry of the antenna).

With continued reference to FIG. 3, the EM logging tool 200 includes a flow channel 202 configured to transport drilling fluid through the tool body 210 (e.g., towards the drill bit). A flow diverter 250 may be deployed in the channel 202 and may be configured to divert the drilling fluid from the centrally located channel 204 in the upper portion of the tool body 210 to an annular flow channel 206 located in the annular space between the collar 210 and the tube 240. In the depicted example embodiment, a first axial end 242 of the tube 240 may be coupled (e.g., threaded, welded, press fit, etc.) to the flow diverter 250. A second opposing axial end 244 of the tube 240 may be coupled (e.g., threaded, welded, press fit, etc.) to a centralizer 260 and optional tube extender 265.

Figure 4:
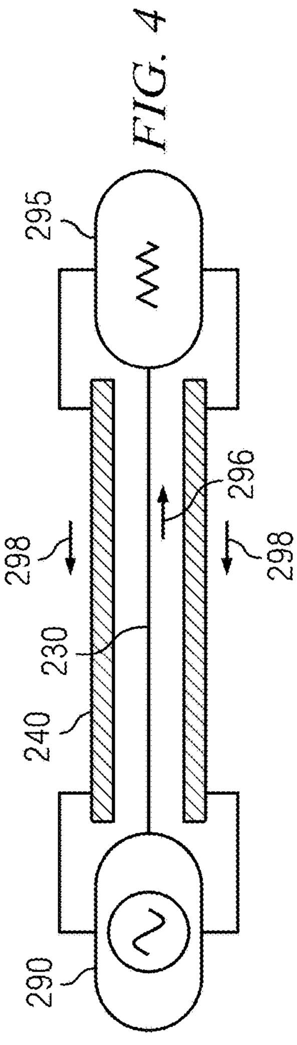
FIG. 4 depicts a schematic electrical circuit diagram for the example embodiment depicted on FIG. 3.

FIG. 4 depicts a schematic electrical circuit diagram including the electrical conductor 230 and the tube 240. As depicted, a power source 290 (e.g., an alternating current source) may be coupled with an electrical load 295 (e.g., a processor requiring electrical power and configured to receive electronic communications) via the electrical conductor 230. As further depicted, the tube 240 is also electrically coupled with the power source 290 and the load 295 and is configured to complete the circuit. Thought of another way, in use, data and/or electrical power may be transmitted from the power source to the load via the electrical conductor 230 (as schematically depicted at 296) with return currents in the tube 240 (as schematically depicted at 298).

With reference again to FIG. 3, the tube 240 may be advantageously fabricated from a highly electrically conductive material (e.g., such as a copper or aluminum alloy). Use of a highly electrically conductive material may advantageously provide a low resistance path for return currents in the tube 240 (as opposed to the collar 210) and may further provide enhanced shielding of the conductor 230 thereby further minimizing or eliminating electromagnetic coupling with the receiver. By highly electrically conductive it may be meant, for example, that the tube material has an electrical conductivity of greater than about $20\times10^6$ S/m (e.g., greater than about $30\times10^6$ S/m, greater than about $40\times10^6$ S/m, or greater than about $50\times10^6$ S/m). By highly electrically conductive it may also be meant, for example, that the tube material has an electrical conductivity that is at least 5 times (e.g., at least 10 times, at least 20 times, at least 25 times, or at least 30 times) greater than the electrical conductivity of the collar material. The tube material may also advantageously be nonmagnetic. In example embodiments, the tube may be fabricated from a copper alloy such as a C11000 alloy having an electrical conductivity of greater than about $50\times10^6$ S/m or an aluminum alloy such as an 1100 alloy having an electrical conductivity of greater than about $30\times10^6$ S/m (the disclosed embodiments are of course not limited in these regards). By way of comparison (and not limitation), nonmagnetic drill collars are commonly fabricated from a nonmagnetic stainless steel, such as a chromium manganese stainless steel, having an electrical conductivity of about $1-2\times10^6$ S/m.

Figure 5:
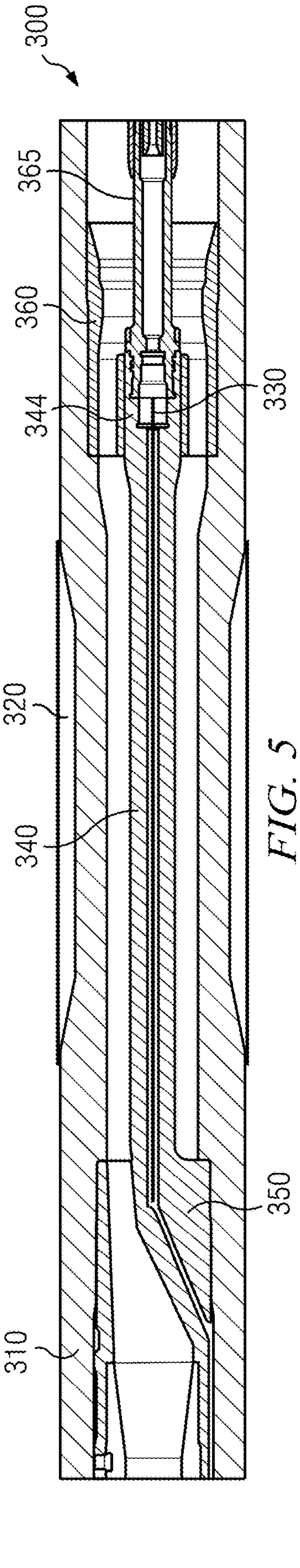
FIG. 5 depicts a receiver portion of another example embodiment of a disclosed EM logging tool.

FIG. 5 depicts a receiver portion of another example EM logging tool embodiment 300. EM logging tool 300 is similar to EM logging tool 200 in that it includes an EM receiver 320 deployed on (about) a corresponding tool body 310. As also described above, the receiver 320 may include substantially any suitable receiving antenna arrangement. Moreover, EM logging tool 300 further includes an electrically conductive tube 340 deployed in and coaxially with the tool body 310 and a corresponding electrical conductor 330 deployed in the tube 340. Still further, one axial end 344 of the tube 340 may be coupled (e.g., threaded, welded, press fit, etc.) to a centralizer 360 and an optional tube extender 365.

With continued reference to FIG. 5, EM logging tool 300 differs from EM logging tool 200 in that the flow diverter 350 and the tube 340 are a single part or component (i.e., a unitary whole). Stated another way, the flow diverter 350 is integral with the tube 340. Such a configuration may advantageously provide a more reliable structure in that it eliminates the joint between the flow diverter 350 and the tube 340. It will be appreciated that in such embodiments the single part that includes the flow diverter 350 and the tube 340 may be fabricated from an electrically conductive material that has both high-strength and wear resistance, such as a beryllium copper alloy.

Figure 6:
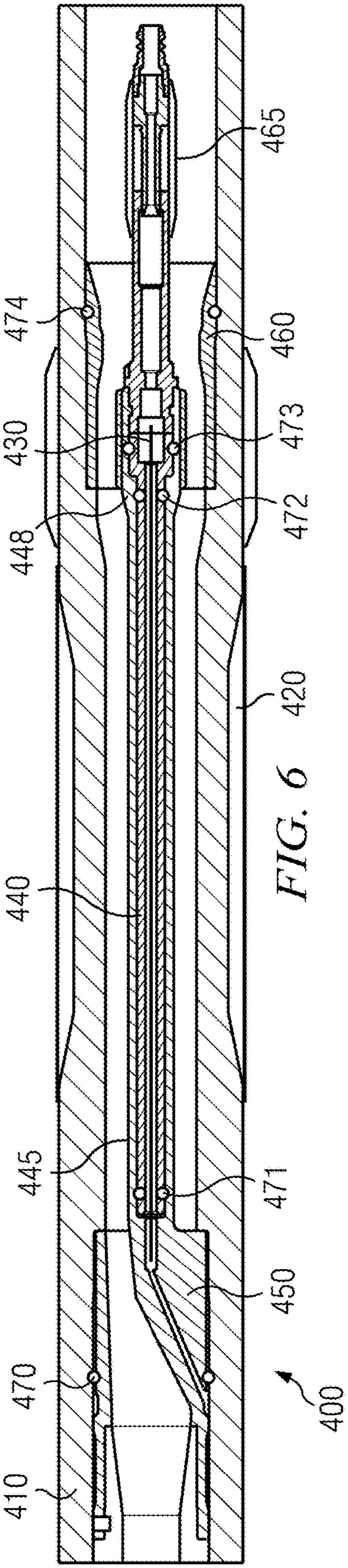
FIG. 6 depicts a receiver portion of still another example embodiment of a disclosed EM logging tool.

FIG. 6 depicts a receiver portion of still another example EM logging tool embodiment 400. EM logging tool 400 is similar to EM logging tool 200 in that it includes an EM receiver 420 deployed on (about) a corresponding tool body 410. As also described above, the receiver 420 may include substantially any suitable receiving antenna arrangement. Moreover, EM logging tool 400 further includes an electrically conductive tube 440 deployed in and coaxially with the tool body 410 and a corresponding electrical conductor 430 deployed in the tube 440.

With continued reference to FIG. 6, EM logging tool 400 differs from EM logging tool 200 in that it includes first and second, inner and outer tubes 440, 445. The inner tube 440 may be advantageously fabricated from a highly electrically conductive material, such as a copper or aluminum alloy, as described above. The outer tube 445 may be fabricated from a comparatively (as compared to the inner tube) high strength, wear resistant material. For example, the outer tube may be fabricated from the same material as the collar 410 (e.g., a nonmagnetic stainless steel) or alternatively from another nonmagnetic alloy. The disclosed embodiments are not limited in these regards.

In example embodiments, the first and second, inner and outer tubes 440, 445 may optionally include a single tube with inner and outer layers, for example, an inner copper layer and an outer nonmagnetic stainless steel layer. Such a composite tube may advantageously promote electrical contact between the inner and outer layers.

While the disclosed embodiments are not limited in this regard, in example embodiments, the flow diverter 450 and the outer tube 445 may be a single part or component (i.e., integral with one another), for example, as described above with respect to EM logging tool 300. Such a configuration may advantageously provide a more reliable structure in that it eliminates the joint between the flow diverter 450 and the outer tube 445. Moreover, an axial end 448 of the outer tube 445 that is opposed from the flow diverter 450 may be coupled (e.g., threaded, welded, press fit, etc.) to a centralizer 460 and tube extender 465. In other example embodiments, the outer tube 445 may be coupled (e.g., threaded, welded, press fit, etc.) with both the flow diverter and the centralizer and/or tube extender.

With continued reference to FIG. 6, the depicted example embodiment may further include a plurality of contact rings 470, 471, 472, 473, and/or 474 deployed and configured to promote electrical conduction between the collar 410 and the flow diverter 450, the outer tube 445 and the inner tube 440, the centralizer 460 and the outer tube 445, and the collar 410 and the centralizer 460. The contact rings 470, 471, 472, 473, 474 may be fabricated from a highly conductive, ductile material such as, copper, silver, or gold, and may be deployed to promote electrical conduction. The disclosed embodiments are, of course, not limited to any particular contact ring material or even to the use of the depicted contact rings.

With continued reference to FIGS. 3, 5, and 6, it will be appreciated that the disclosed embodiments may advantageously reduce the electromagnetic coupling voltage between the electrical conductor 230, 330, 430 and the electromagnetic receiving antenna(s) 220, 320, 420. While not wishing to be bound by theory, it is believed that deployment of the electrical conductor 230, 330, 430 along the tool axis and the shielding provided by the conductive tube 240, 340, 440 significantly reduces (or substantially eliminates) such electromagnetic coupling. In advantageous embodiments the electromagnetic coupling voltage between the electrical conductor in the receiving antenna(s) is less than 100 μV/A (microvolts per amp of alternating current in the conductor) at frequencies of 500 Hz and above. In particularly advantageous embodiments, for example, embodiments suitable for making deep reading electromagnetic measurements, the electromagnetic coupling voltage may be less than 80 μV/A (e.g., less than 60 μV/A, less than 40 μV/A, or even less than 20 μV/A) at frequencies of 500 Hz and above.

Figure 7:
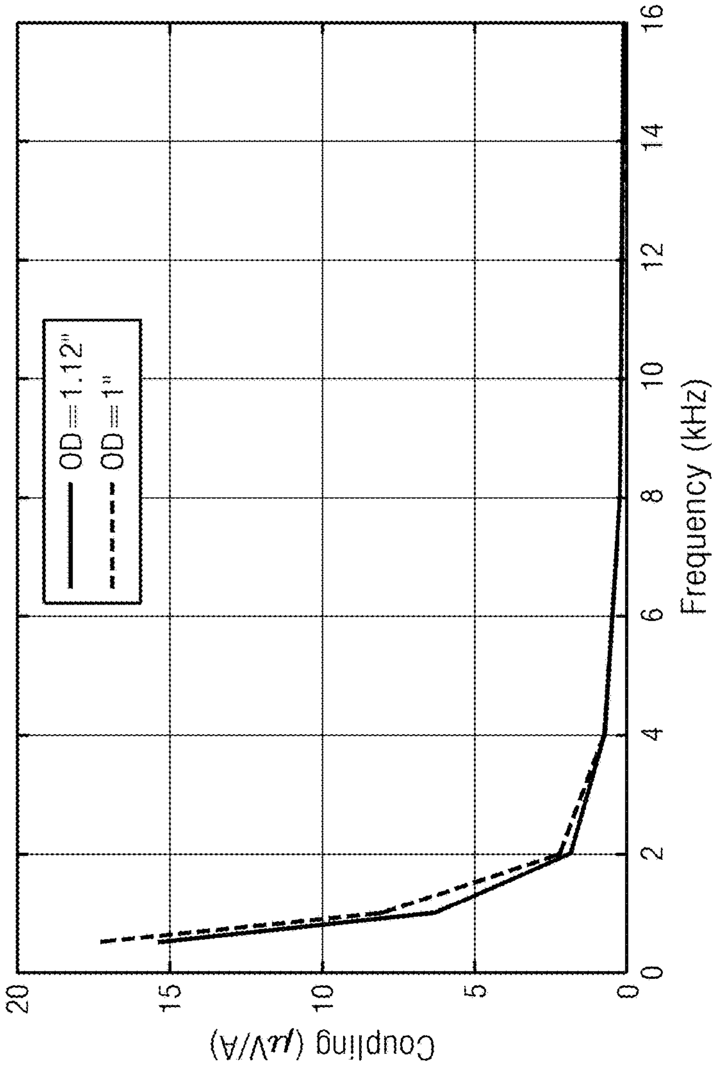
FIG. 7 depicts a plot of a measured electromagnetic coupling voltage versus frequency for the EM logging tool shown on FIG. 6.

Turning now to FIG. 7, a plot of a modeled electromagnetic coupling voltage versus frequency is depicted (measurements were made at 0.5, 1, 2, 4, 8, and 16 kHz). The coupling voltages were measured using a logging tool configured as described above with respect to FIG. 6. The dashed line indicates measured coupling voltages for an embodiment in which the inner tube 440 had an outer diameter of 2.5 cm and the solid line indicates measured coupling voltages for an embodiment in which the inner tube 440 had an outer diameter of 3 cm. The observed coupling voltages were advantageously less than 20 μV/A for both embodiments at each of the measurement frequencies. Note also that the measured coupling voltages decreased sharply with increasing frequency to values of less than 1 μV/A at frequencies above 4 kHz and that the coupling voltages decrease with increasing inner tube OD.

It will be understood that the disclosure includes numerous embodiments. These embodiments include, but are not limited to, the following embodiments.

In a first embodiment, an electromagnetic logging tool comprises a logging while drilling tool body having a longitudinal axis; at least one electromagnetic receiving antenna deployed on the tool body, the at least one receiving antenna configured to receive a complex voltage signal and thereby make electromagnetic logging measurements; an electrically conductive tube deployed in the tool body and within an inner diameter of the at least one receiving antenna, a longitudinal axis of the tube coincident with the longitudinal axis of the tool body; and an insulated electrical conductor deployed in the tube, the electrical conductor configured to transmit electronic data and/or electrical power from one axial end of the tool body to an opposing axial end of the tool body.

A second embodiment may include the first embodiment, wherein the at least one electromagnetic receiving antenna comprises first and second collocated transverse receiving antennas or first and second rotationally offset tilted antennas.

A third embodiment may include any one of the first through second embodiments, wherein the electromagnetic logging tool is a receiver sub and the at least one electromagnetic receiving antenna is configured to make deep reading electromagnetic logging measurements via electromagnetically coupling with a transmitting antenna deployed on a transmitter sub that is distinct from the receiver sub.

A fourth embodiment may include any one of the first through third embodiments, wherein a first axial end of the tube is coupled with a flow diverter that is configured to divert drilling fluid flow from a central flow channel to an annular flow channel and a second axial end of the tube is coupled with a centralizer that is deployed in the tool body.

A fifth embodiment may include any one of the first through fourth embodiments, wherein the tube is integral with a flow diverter that is configured to divert drilling fluid flow from a central flow channel to an annular flow channel.

A sixth embodiment may include any one of the first through fifth embodiments, wherein the tube comprises first and second, inner and outer electrically conductive, non-magnetic tubes.

A seventh embodiment may include the sixth embodiment, wherein the first inner tube has an electrical conductivity that is at least 10 times greater than an electrical conductivity of the tool body.

An eighth embodiment may include any one of the sixth through seventh embodiments, wherein the outer tube is integral with a flow diverter that is configured to divert drilling fluid flow from a central flow channel to an annular flow channel.

A ninth embodiment may include any one of the sixth through eighth embodiments, further comprising a plurality of electrical contact rings that provide electrical contact between the inner tube, the outer tube, and the tool body.

A tenth embodiment may include any one of the first through ninth embodiments, wherein an electromagnetic coupling between the electrical conductor and the at least one receiving antenna is less than 100 micro volts per amp of alternating electrical current in the electrical conductor at frequencies 500 Hz and above.

In an eleventh embodiment a deep reading electromagnetic tool comprises a transmitter sub configured for deployment in a drill string, the transmitter sub including at least one electromagnetic transmitting antenna deployed on a transmitter sub body, the at least transmitting antenna configured to transmit electromagnetic energy into a surrounding environment; a receiver sub configured for deployment in a drill string, the receiver sub including at least one receiver antenna deployed on a receiver sub body, the at least one receiver antenna configured to receive a complex voltage signal induced by the transmitted electromagnetic energy and thereby make electromagnetic logging measurements; an electrically conductive tube deployed in the receiver sub body and within an inner diameter of the at least one receiving antenna, a longitudinal axis of the tube coincident with a longitudinal axis of the receiver sub body; and an insulated electrical conductor deployed in the tube, the electrical conductor configured to transmit electronic data and/or electrical power from one axial end of the receiver sub body to an opposing axial end of the receiver sub body.

A twelfth embodiment may include the eleventh embodiment, wherein the at least one electromagnetic transmitting antenna comprises a triaxial set of transmitting antennas;

and the at least one electromagnetic receiving antenna comprises a triaxial set of receiving antennas.

A thirteenth embodiment may include any one of the eleventh through twelfth embodiments, wherein the tube comprises first and second, inner and outer electrically conductive, nonmagnetic tubes.

A fourteenth embodiment may include the thirteenth embodiment, wherein the first inner tube has an electrical conductivity that is at least 10 times greater than an electrical conductivity of the receiver sub body.

A fifteenth embodiment may include any one of the thirteenth through fourteenth embodiments, wherein an electromagnetic coupling between the electrical conductor and the at least one receiving antenna is less than 100 micro volts per amp of alternating electrical current in the electrical conductor at frequencies 500 Hz and above.

In a sixteenth embodiment an electromagnetic logging tool comprises a logging while drilling tool body; at least one electromagnetic receiving antenna deployed on the tool body, the at least one receiver antenna configured to receive a complex voltage signal and thereby make electromagnetic logging measurements; first and second electrically conductive, nonmagnetic inner and outer tubes deployed in the tool body and within an inner diameter of the at least one receiving antenna, a longitudinal axis of the inner tube coincident with a longitudinal axis of the tool body; and an insulated electrical conductor deployed in the inner tube, the electrical conductor configured to transmit electronic data and/or electrical power from one axial end of the tool body to an opposing axial end of the tool body.

A seventeenth embodiment may include the sixteenth embodiment, wherein the at least one electromagnetic receiving antenna comprises first and second collocated transverse receiving antennas or first and second rotationally offset tilted antennas.

An eighteenth embodiment may include any one of the sixteenth through seventeenth embodiments, wherein the first inner tube has an electrical conductivity that is at least 10 times greater than an electrical conductivity of the tool body.

A nineteenth embodiment may include any one of the sixteenth through eighteenth embodiments, wherein the outer tube is integral with a flow diverter that is configured to divert drilling fluid flow from a central flow channel to an annular flow channel.

A twentieth embodiment may include any one of the sixteenth through nineteenth embodiments, wherein an electromagnetic coupling between the electrical conductor and the at least one receiving antenna is less than 100 micro volts per amp of alternating electrical current in the electrical conductor at frequencies 500 Hz and above.

Although an EM logging tool employing wire tube interference mitigation has been described in detail, it should be understood that various changes, substitutions and alterations can be made herein without departing from the spirit and scope of the disclosure as defined by the appended claims.

The invention claimed is:

1. An electromagnetic logging tool comprising:

a tool body having a body longitudinal axis, a flow channel extending through the tool body, and an outer surface;

at least one electromagnetic receiving antenna deployed on the outer surface of the tool body, the at least one electromagnetic receiving antenna configured to receive a complex voltage signal and thereby make electromagnetic logging measurements;

an electrically conductive tube deployed in the flow channel of the tool body and within an inner diameter of the at least one electromagnetic receiving antenna, a tube longitudinal axis of the electrically conductive tube coincident with the body longitudinal axis of the tool body, wherein the electrically conductive tube includes a tube bore extending through the electrically conductive tube; and an insulated electrical conductor deployed in the tube bore of the electrically conductive tube and within the inner diameter of the at least one electromagnetic receiving antenna, the insulated electrical conductor configured to transmit at least one of electronic data or electrical power from a first axial end of the tool body to a second axial end of the tool body, wherein the insulated electrical conductor is substantially coincident with the electrically conductive tube and the body longitudinal axis of the tool body.

2. The logging tool of claim 1, wherein the at least one electromagnetic receiving antenna comprises first and second collocated transverse receiving antennas or first and second rotationally offset tilted antennas.

3. The logging tool of claim 1, wherein the electromagnetic logging tool is a receiver sub and the at least one electromagnetic receiving antenna is configured to make deep reading electromagnetic logging measurements via electromagnetically coupling with a transmitting antenna deployed on a transmitter sub that is distinct from the receiver sub.

4. The logging tool of claim 1, wherein the first axial end of the tool body is coupled with a flow diverter that is configured to divert drilling fluid flow from a central flow channel to an annular flow channel and the second axial end of the tool body is coupled with a centralizer that is deployed in the tool body.

5. The logging tool of claim 1, wherein the electrically conductive tube is integrally formed with a flow diverter that is configured to divert drilling fluid flow from a central flow channel to an annular flow channel.

6. The logging tool of claim 1, wherein the electrically conductive tube comprises an inner tube and an outer tube, wherein the inner tube and the outer tube are electrically conductive and nonmagnetic.

7. The logging tool of claim 6, wherein the inner tube has an inner tube electrical conductivity that is at least 10 times greater than a body electrical conductivity of the tool body.

8. The logging tool of claim 6, wherein the outer tube is integrally formed with a flow diverter that is configured to divert drilling fluid flow from the flow channel to an annular flow channel between the tool body and the electrically conductive tube.

9. The logging tool of claim 6, further comprising a plurality of electrical contact rings that provide electrical contact between the inner tube, the outer tube, and the tool body.

10. The logging tool of claim 1, wherein an electromagnetic coupling between the insulated electrical conductor and the at least one electromagnetic receiving antenna is less than 100 micro volts per amp of alternating electrical current in the insulated electrical conductor at frequencies 500 Hz and above.

11. The logging tool of claim 1, further comprising:

a power source; and a processor utilizing power and configured to receive and transmit electronic communications, wherein the insulated electrical conductor extends from the power source, to the electrically conductive tube at the first axial end, through the tube bore to the second axial end, and to the processor, and wherein the insulated electrical conductor provides the power to the processor from the power source.

12. The logging tool of claim 11, wherein the processor and the power source are in electrical communication with the electrically conductive tube, and a return current is provided at the electrically conductive tube.

13. A deep reading electromagnetic logging tool comprising:

a transmitter sub configured for deployment in a drill string, the transmitter sub including at least one electromagnetic transmitting antenna deployed on a transmitter sub body, the at least one electromagnetic transmitting antenna configured to transmit electromagnetic energy into a surrounding environment;

a receiver sub configured for deployment in the drill string, the receiver sub including a receiver sub body and at least one electromagnetic receiving antenna deployed on an outer surface of the receiver sub body, the at least one electromagnetic receiving antenna configured to receive a complex voltage signal induced by the electromagnetic energy and thereby make electromagnetic logging measurements;

an electrically conductive tube deployed in a flow channel in the receiver sub body and within an inner diameter of the at least one electromagnetic receiving antenna, a tube longitudinal axis of the electrically conductive tube coincident with a body longitudinal axis of the receiver sub body, wherein the electrically conductive tube includes a tube bore extending through the electrically conductive tube; and an insulated electrical conductor deployed in the tube bore of the electrically conductive tube and within the inner diameter of the at least one electromagnetic receiving antenna, the insulated electrical conductor configured to transmit at least one of electronic data or electrical power from a first axial end of the receiver sub body to a second axial end of the receiver sub body, wherein the insulated electrical conductor is substantially coincident with the electrically conductive tube and the body longitudinal axis of the receiver sub body.

14. The logging tool of claim 13, wherein:

the at least one electromagnetic transmitting antenna comprises a triaxial set of transmitting antennas; and the at least one electromagnetic receiving antenna comprises a triaxial set of receiving antennas.

15. The logging tool of claim 13, wherein the electrically conductive tube comprises an inner tube and an outer tube, wherein the inner tube and the outer tube are electrically conductive and nonmagnetic.

16. The logging tool of claim 15, wherein the inner tube has an inner tube electrical conductivity that is at least 10 times greater than a body electrical conductivity of the receiver sub body.

17. The logging tool of claim 15, wherein an electromagnetic coupling between the insulated electrical conductor and the at least one electromagnetic receiving antenna is less than 100 micro volts per amp of alternating electrical current in the insulated electrical conductor at frequencies 500 Hz and above.

18. An electromagnetic logging tool comprising:

a tool body;

a power source in the tool body;

a processor in the tool body;

at least one electromagnetic receiving antenna deployed on the tool body, the at least one electromagnetic receiving antenna configured to receive a complex voltage signal and thereby make electromagnetic logging measurements;

an inner tube and an outer tube deployed in the tool body and within an inner diameter of the at least one electromagnetic receiving antenna, an inner tube longitudinal axis of the inner tube coincident with a body longitudinal axis of the tool body, wherein the inner tube and the outer tube are electrically conductive and nonmagnetic; and an insulated electrical conductor deployed in the inner tube and within the inner diameter of the at least one electromagnetic receiving antenna, the insulated electrical conductor configured to transmit at least one of electronic data or electrical power from a first axial end of the tool body to a second axial end of the tool body, wherein the insulated electrical conductor is substantially coincident with the inner tube, the outer tube, and the body longitudinal axis of the tool body, and wherein the insulated electrical conductor extends from the power source, to the inner tube at the first axial end, through the inner tube to the second axial end, and to the processor, and wherein the insulated electrical conductor provides power to the processor from the power source.

19. The logging tool of claim 18, wherein the inner tube has an inner tube electrical conductivity that is at least 10 times greater than a body electrical conductivity of the tool body.

20. The logging tool of claim 18, wherein an electromagnetic coupling between the insulated electrical conductor and the at least one electromagnetic receiving antenna is less than 100 micro volts per amp of alternating electrical current in the insulated electrical conductor at frequencies 500 Hz and above.

* * * * *